Feb. 9, 1937.   J. A. ZUBLIN   2,069,797
CORE DRILL
Filed June 22, 1936

Inventor
John A. Zublin
By J. W. Rodgers
Attorney

Patented Feb. 9, 1937

2,069,797

UNITED STATES PATENT OFFICE 2,069,797

CORE DRILL

John A. Zublin, Los Angeles, Calif.

Application June 22, 1936, Serial No. 86,688

12 Claims. (Cl. 255—71)

While the present invention relates generally to oil well tools, it is more especially concerned with core drills adapted to operate in rock and other relatively hard formations, and of the type which remove the formation in an annular path to leave at the center of the hole a core which passes up between the cutting elements and enters a barrel adapted to receive the core.

For reasons that are well known in the art, oil well tools used successfully in rock and other hard formations nearly always have rotating cutters, since they produce the best kind of drilling motion. However, there are conflicting requirements for best design. To secure the maximum penetration of the cutters, it is necessary to have only a minimum portion of the cutters in contact with the formation at any one time, as higher pressure per unit area increases the penetration of the teeth. On the other hand, to give a long life to the tool and keep down the cost of drilling it is necessary to provide a maximum of cutting teeth on the tool, since the life of the tool is generally proportional to the total number and size of cutting teeth available to cut the formation, and an increase in the total number of teeth is usually accompanied by a like increase in the number of teeth cutting at one time.

It becomes apparent that the ideal tool has a large total amount of cutting surface, but has only a small part of that surface "active" or in drilling contact at any one time, the remainder of the cutting surface being, in effect, "in reserve", since it does its share of the cutting after the first "active" portion moves out of contact with the formation. In reaming tools of conventional types using roller cutters, all the cutters are generally in simultaneous engagement with the formation, so the "reserve" cutting surface is limited to that portion of each cutter not so engaged, and amounts to but a few, perhaps three or four, times the "active" cutting surface, whereas an increase in the ratio between "reserve" and "active" portions increases both the efficiency and the life of the tool.

If a member rotatable about an axis on a tool is brought into contact with the formation, and the tool as a whole is rotated, there is a natural tendency for the member to rotate about its own axis on the tool. This natural tendency is strong and positive, and will move cutters mounted on the rotatable member into and out of cutting engagement with the formation, and so bring entire cutters intermittently into active position from reserve.

It is a general object of my invention both to decrease the amount of active cutting area which is at any one time in cutting position, and to increase the amount of reserve area, with a view to increasing the drilling rate of the tool and lengthening the life of the tool.

It is also an object of the invention to provide a core drill which, in addition to the usual reserve cutting area on each cutter, has a sufficiently large number of cutters that several entire cutters are in reserve, and are, as a whole, successively brought into cutting position and then returned to the non-cutting position.

Another object is to provide a core drill with rolling cutters mounted at different positions and different angles upon a carrier so that the cutters will move with a substantially rolling motion over parts of the hole lying at angles to each other and the carrier, as the side and bottom of the hole, so that the cutters act at all times at a high efficiency.

It is another object of my invention to provide a core drill with a plurality of rotatable cutter carriers rotated by their natural tendency to turn when in contact with the formation, and bringing successive cutters intermittently into cutting contact with the formation.

It is also a main object of the invention to provide a core drill in which removal of the formation is done solely by roller cutters which trim the core to size without the aid of a fixed annular cutter or the like.

And a further object is to provide a core drill with rolling cutters which each cut on the hole sides and bottom or which are divided into groups so that a portion of the cutters ream the hole side while other cutters cut on the bottom of the hole to enlarge the hole and to trim the core to proper size.

These objects are attained in a core drill having a core receiving barrel by rotatably mounting on the drill a plurality of cutter carriers each with a plurality of rolling cutters rotatably mounted on it. The carriers move the cutters over an annular path from which the formation is removed and so cut a core of a proper size to enter the barrel. The carriers are inclined to enable the cutters to remove formation to the extent required to cut the core.

Drill bits embodying my invention are shown in my copending cases entitled "Drill bit with rolling cutters", Ser. No. 56,252, filed December 26, 1935, now Patent No. 2,050,989, and "Rotary drill bit with rolling cutters", Ser. No. 71,600, filed March 30, 1936, now Patent No. 2,050,988, and these earlier cases contain claims to subject matter common to all three cases, the claims in the present case being directed to matter peculiar to this case alone.

How the above and other objects of my invention are attained will be more readily understood by reference to the following description and the annexed drawing, in which.

Figure 1:
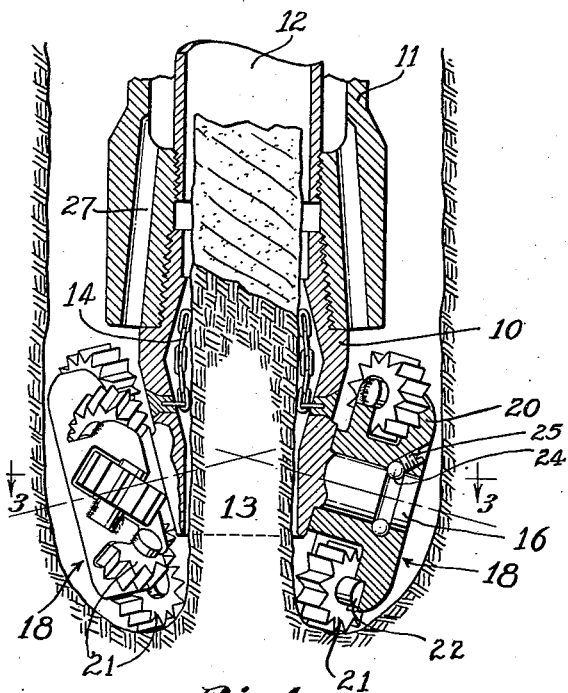
Fig. 1 is a fragmentary view of a core drill, partly in section and partly in elevation, constructed according to my invention.
Figure 2:
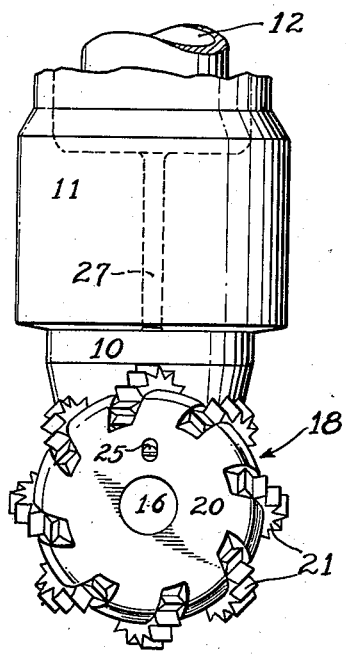
Fig. 2 is a fragmentary side elevation of the core drill as viewed from the right of Fig. 1.
Figure 3:
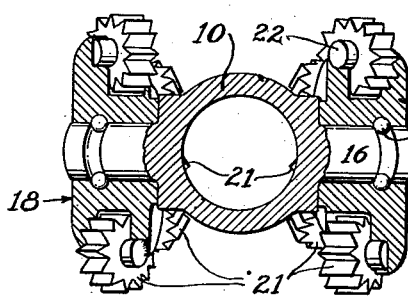
Fig. 3 is a horizontal section on line 3—3 of Fig. 1.

Referring to Figs. 1 to 3, there is shown a core drill comprising a core head 10 having a central opening for a core to move upwardly therethrough, and mounted on the lower end of outer barrel 11. Inside the outer barrel 11 and attached to it is inner barrel 12 adapted to receive and protect core 13 after it has been formed, as will be well understood by those versed in the art. In order to prevent the core from dropping out of the drill as the tool is removed from the well, core catching means is provided in the form of chains 14 which wrap around the core and wedge into the space between the core and the lower constricted portion of core head 10. This core catching means is described and claimed in my Patent No. 1,859,950.

The lower end of head 10 is provided with a pair of integral studs 16 which provide journal bearings upon which are rotatably mounted the cutter assemblies, generally indicated at 18. These bearings 16 are inclined to the horizontal so that cutter assemblies 18 rotate about axes which are inclined upwardly and inwardly, and are here shown as intersecting at or near the center of the drill. Although only two cutter assemblies are shown mounted upon the core drill, a larger number may be used if desired.

Each cutter assembly 18 comprises a circular wheel-like body 20 with a plurality of roller cutters 21 rotatably mounted, in slots about the body periphery, upon axle pins 22. The ends of pins 22 are secured to the body by any suitable means, as by welding. Rolling cutters 21 may be of any suitable size and shape and have any desired tooth formation, though they are here shown as substantially cylindrical, and project radially beyond the carrier to engage the formation. As will be seen from Figs. 1 and 3, the axes of revolution of the cutters are in planes parallel to the axis of revolution to the carrier and so do not intersect the carrier axis, but lie at an angle thereto. Additional details of construction and variational forms of cutter mountings are shown in my copending application, "Cutter assembly for oil well tools", filed on even date herewith.

Carrier 20 is held in place on bearing 16 by means of matching annular grooves, one in the bearing and one in the body, which together form a channel that holds a plurality of ball bearings 24, this arrangement permitting free rotation of the body about bearing 16 but holding it securely against axial displacement. The balls are held in the channel by means of threaded plug 25.

Circulation fluid passes down in the annular space between inner barrel 12 and outer barrel 11, and is discharged through nozzles 27 onto the rolling cutters 21 to clean them.

Cutter assemblies 18 are mounted on the outside of core head 20 and rotate in an annular path from which formation is removed by the action of cutters 21, and so leave at the center of the hole core 13 which is of a size to pass upwardly through the core head and enter the barrel 12. As carriers 20 rotate, the several cutters upon each carrier are successively brought into intermittent contact with the formation and cut away the formation at the sides and bottom of the hole; and since all the cutters are mounted in a similar manner on the carrier, all the cutters operate on both the sides and bottom to keep the hole to full gauge and to trim the core to proper size. The planes of revolution of carriers 20 are inclined inwardly and downwardly so that cutters 21 are enabled to remove the formation directly underneath head 10 and barrel 12, and trim the core to proper size, it being clear that, other dimensions remaining constant, the size of the core will be determined by the inclination of the carriers.

Figure 4:
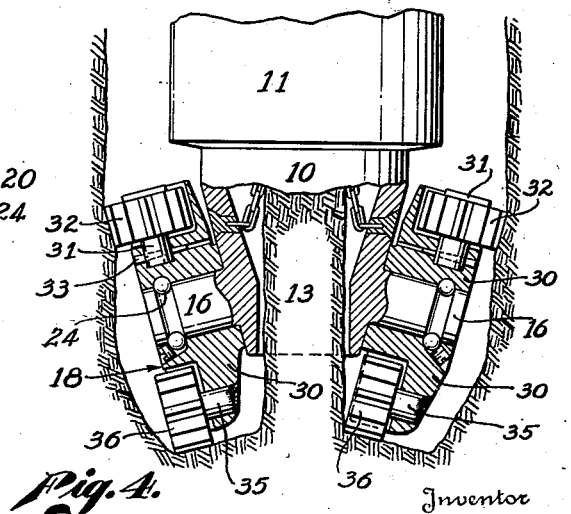
Fig. 4 is a fragmentary view, partially in section and partially in elevation, of a variational form of core drill.

A variational form of core tool is shown in Fig. 4 which is constructed in the same manner as already described, except that rolling cutters are mounted in a somewhat different manner upon carriers 30. On each of carriers 30 a portion of the cutters are mounted on pins 31 so that they rotate about radial axes perpendicular to the axis of carrier rotation. These cutters 32 project beyond one side of the carrier body and remove formation at the sides of the hole and keep the hole to full gauge by a reaming action. Cutters 32 are mounted upon pins 31 having a head on their outer end and seated in the cutter body on their inner end, the axle pins being held in place by some suitable means, such as a taper pin 33.

The remainder of the cutters are mounted on axle pins 35 to rotate about axes parallel to the axis of carrier rotation, and these cutters 36 project radially beyond the carrier to remove formation at the bottom of the hole as do cutters 21 in Fig. 1. Preferably a portion of cutters 36 are offset toward the outside face of carrier 30 so that they remove formation at the bottom of the hole adjacent the side walls of the hole, and thus operate to enlarge the hole; while the remainder of cutters 36 are offset toward the inner face of carrier 30 and remove formation from the bottom of the hole adjacent core 13 and so operate to trim the core to size. Cutters 36 may be mounted upon the same carrier 30 in both of these two positions, or the cutters on one carrier may be confined to one position so that they cut on the bottom either near the outside next to the wall or near the inside next to the core.

It will be understood that changes may be made in the construction and the arrangement of the various parts without departing from the spirit and scope of my invention, and it is therefore to be understood that the appended claims are illustrative of rather than restrictive upon the broad scope of my invention.

I claim as my invention:

1. In a core drill, the combination of a barrel adapted to receive a core, a plurality of cutter carriers rotatably mounted on the drill, and a plurality of roller cutters rotatably mounted on each carrier, said carriers and cutters being adapted to remove formation in an annular path and leave a central core of proper size to enter the barrel.

2. In a core drill, the combination of a barrel adapted to receive a core, means to retain a core in the barrel, a plurality of cutter carriers rotatably mounted on the drill, and a plurality of roller cutters rotatably mounted on each carrier, the planes of revolution of the carriers being inclined inwardly and downwardly so that the cutters remove formation beneath the drill except for a central core beneath the barrel of a size to enter the barrel.

3. In a core drill, the combination of a barrel adapted to receive a core, a plurality of cutter carriers rotatably mounted on the drill, and a plurality of toothed, substantially cylindrical roller cutters rotatably mounted on each carrier, said carriers and cutters being adapted to remove formation in an annular path and leave a central core of proper size to enter the barrel.

4. In a core drill, the combination of a barrel adapted to receive a core, a plurality of cutter carriers rotatably mounted on the drill, and a plurality of roller cutters rotatably mounted on each carrier and projecting radially beyond the carrier to remove formation beneath the carrier, said carriers and cutters being adapted to remove formation in an annular path and leave a central core of proper size to enter the barrel.

5. In a core drill, the combination of a barrel adapted to receive a core, a plurality of cutter carriers rotatably mounted on the drill to rotate about axes inclined upwardly and inwardly, and a plurality of roller cutters rotatably mounted on each carrier, said carriers and cutters being adapted to remove formation in an annular path and leave a central core of proper size to enter the barrel.

6. In a core drill having in combination a barrel adapted to receive a core, a pair of cutter carriers rotatably mounted on the drill to rotate about axes which are inclined upwardly and inwardly to intersect at the center of the drill, and a plurality of roller cutters rotatably mounted on each carrier, said carriers and cutters being adapted to remove formation in an annular path and leave a central core of proper size to enter the barrel.

7. In a core drill, the combination of a barrel adapted to receive a core, a plurality of cutter carriers rotatably mounted on the drill, and a plurality of roller cutters rotatably mounted on each carrier to revolve about axes inclined to but not intersecting the axis of carrier rotation, said carriers and cutters being adapted to remove formation in an annular path and leave a central core of proper size to enter the barrel.

8. In a core drill, the combination of a barrel adapted to receive a core, a plurality of cutter carriers rotatably mounted on the drill to rotate about axes inclined upwardly and inwardly, and a plurality of roller cutters rotatably mounted on each carrier to revolve about axes inclined to but not intersecting the axis of carrier rotation, said carriers and cutters being adapted to remove formation in an annular path and leave a central core of proper size to enter the barrel.

9. In a core drill, the combination of a barrel adapted to receive a core, a plurality of cutter carriers rotatably mounted on the drill to rotate about axes inclined upwardly and inwardly, and a plurality of toothed, substantially cylindrical roller cutters rotatably mounted on each carrier and projecting radially beyond the carrier, said carriers and cutters being adapted to remove formation in an annular path and leave a central core of proper size to enter the barrel.

10. In a core drill, the combination of a barrel adapted to receive a core, a plurality of cutter carriers rotatably mounted on the drill, and a plurality of roller cutters rotatably mounted on each carrier, a portion of the cutters projecting radially beyond the carrier to remove formation at the bottom of the hole and a portion of the cutters projecting beyond the side of the carrier to remove formation from the sides of the hole, said carriers and cutters being adapted to remove formation in an annular path and leave a central core of proper size to enter the barrel.

11. In a core drill, the combination of a barrel adapted to receive a core, a plurality of cutter carriers rotatably mounted on the drill, and a plurality of roller cutters rotatably mounted on each carrier to turn about axes, part of which are parallel to the axis of carrier revolution and part of which are perpendicular to the axis of carrier revolution, said carriers and cutters being adapted to remove formation in an annular path and leave a central core of proper size to enter the barrel.

12. In a core drill, the combination of a barrel adapted to receive a core, a plurality of cutter carriers rotatably mounted on the drill, and a plurality of roller cutters rotatably mounted on each carrier, said carriers and cutters being adapted to remove formation in an annular path and leave a central core of proper size to enter the barrel, a portion of the cutters projecting beyond the sides of the carrier to remove formation from the sides of the hole by reaming, another portion of the cutters projecting radially beyond the carrier to remove formation from the bottom of the hole adjacent the sides to enlarge the hole, and another portion of the cutters projecting radially beyond the carrier to remove formation from the bottom of the hole adjacent the core to trim the core to size.

JOHN A. ZUBLIN.